(12) United States Patent
Liu

(10) Patent No.: US 8,057,346 B2
(45) Date of Patent: Nov. 15, 2011

(54) AUTOMATIC STEPLESS TRANSMISSION

(76) Inventor: Haiping Liu, Guangdong (CN)

( * ) Notice: Subject to any disclaimer, the term of this patent is extended or adjusted under 35 U.S.C. 154(b) by 955 days.

(21) Appl. No.: 11/997,747

(22) PCT Filed: Jul. 3, 2006

(86) PCT No.: PCT/CN2006/001537
§ 371 (c)(1),
(2), (4) Date: Feb. 4, 2008

(87) PCT Pub. No.: WO2007/016840
PCT Pub. Date: Feb. 15, 2007

(65) Prior Publication Data
US 2008/0227579 A1    Sep. 18, 2008

(51) Int. Cl.
*F16H 1/32* (2006.01)
*F16F 15/22* (2006.01)
(52) U.S. Cl. ........................................ 475/162; 74/570.1
(58) Field of Classification Search .................. 475/162; 74/570.1, 571.11
See application file for complete search history.

(56) References Cited

U.S. PATENT DOCUMENTS

| | | | | |
|---|---|---|---|---|
| 6,322,299 B1 * | 11/2001 | Hartman | ................ | 409/141 |
| 2004/0038622 A1 * | 2/2004 | Dehde | ................ | 451/1 |

* cited by examiner

*Primary Examiner* — Edwin A Young

(57) ABSTRACT

An automatic stepless transmission includes a driving shaft, a driving disk rotatable by the driving shaft, and a clutch assembly rotatable by the driving disk. Two parallel guiding slots are provided on the driving shaft. An eccentric plate with a notch is sleeved onto the driving shaft. A compressible resilient regulation mechanism is disposed between the notch and the driving shaft. The driving disk is installed on the eccentric plate via a bearing. The eccentric plate offsets in relation to the axis of the driving shaft, and at the same time the eccentric plate drives the driving disk offset. The automatic stepless transmission can compress or release the resilient regulation mechanism according to loads. The eccentricity between the eccentric plate and the driving shaft can therefore be adjusted, and the eccentric plate can drive the driving disk to move. Thus, the eccentricity of the driving disk can be regulated without manual work. The transmission has a simple structure and can be operated easily. It can adjust the transmission ratio automatically. Therefore the cost and the failure rate can be reduced efficiently.

20 Claims, 4 Drawing Sheets

AUTOMATIC STEPLESS TRANSMISSION

FIELD OF THE APPLICATION

The present application relates generally to a transmission, and particularly to an automatic stepless transmission.

BACKGROUND

Variable transmission is widely used in bike, electric bike, automobile, cloth rolling machine, and paper rolling machine. These variable transmissions generally use gear variable transmission structure or eccentric clutch structure. Gear variable transmission realizes gear shifting through gear transmission by using different sizes of gears. This transmission method causes loud noise and friction by the impact of gears. It is not suitable for long term and high efficient usage.

Chinese Patent No. 92105836.5 discloses a sliding block eccentric clutch of a stepless transmission. As shown in FIGS. 7 and 8, the stepless transmission 4 includes fixing tube 41, supporting tube 42, shaft 425, clamps 431,432, spring spreader 433, sliding rod 44, U-shape motion actuating rack 45, wire-tying bolt 451, connecting parts 452, ball bearing 453, control parts 454, 455, and two ends 46, 461 of a steel wire. In operation, a user pulls the end 46 or 461 of the steel wire by a control handle. This in turn pulls control part 455, actuates control part 454, ball bearing 453, connecting parts 452, wire-tying bolt 451, as well as clamps 431, 432, slides clamps 431, 432 along sliding rod 44, and connects supporting tube 42 to slotted plate 1 so that relative movements of fixing tube 41 and clutch parts 2, 2a regulate the degree of eccentricity for controlling the transmission. This kind of transmission has complicated structures and requires manual operation. This kind of transmission cannot satisfy some conditions required to input power and regulate variable ratio according to load. For example, when a reel block of a cloth rolling machine is continuously rolling cloth, the load is increasing.

SUMMARY

There is a need to provide a transmission that can solve the technical problems facing the current stepless transmission technology, and to provide an automatic stepless transmission which is simple in structure and can automatically regulate eccentricity and variable ratio.

According to one aspect of the present application, the automatic stepless transmission includes a drive shaft, a drive disk driven by the drive shaft, and a clutch wheel assembly driven by the drive disk. An outer surface of the drive shaft is provided with two parallel guide slots. The drive shaft is received in a notch of an eccentric plate at the position of the guide slots. The notch of the eccentric plate defines two parallel segments abutting against the guide slots and allowing the eccentric plate to move only parallel to the guide slots. A compressible resilient regulation mechanism is disposed between an inner side of the eccentric plate and an outer surface of the drive shaft. The drive disk is mounted on the eccentric plate through a bearing. The eccentric plate carries out eccentric motion vertically towards the axis of the drive shaft under the regulation of the resilient regulation mechanism, and drives the drive disk to carry out corresponding eccentric motion. The notch of the eccentric plate further defines an arc segment extending between the ends of the parallel segments for mating with the outer surface of the drive shaft.

In one embodiment, the resilient regulation mechanism is in the form of a spring or rubber disposed between an inner side of the eccentric plate and an outer surface of the drive shaft.

In another embodiment, the resilient regulation mechanism is in the form of a chamber provided on the drive shaft, and a piston connected to the eccentric plate, and the chamber is filled with gas or liquid under a predetermined pressure.

The maximum eccentricity of the drive disk is half the difference of the inner diameter of the bearing and the diameter of the drive shaft.

The automatic stepless transmission can automatically regulate the eccentricity of the eccentric plate and the drive shaft according to the load acting on the compressible resilient regulation mechanism, and the eccentric plate can drive the drive disk to carry out motion for regulating the eccentricity of the drive disk. There is no requirement for manual regulation of the eccentricity. It results in automatic variable ratio, simple structure, low cost, low fault rate, and ease in operation.

BRIEF DESCRIPTION OF THE DRAWINGS

Specific embodiments of the automatic stepless transmission disclosed in the present application will now be described by way of example with reference to the accompanying drawings wherein.

DETAILED DESCRIPTION

As shown in FIGS. 1-6, an automatic stepless transmission, according to an embodiment of the present application, includes a drive shaft 10, an eccentric plate 20 sleeved on the drive shaft 10, a resilient regulation mechanism 30 equipped between the eccentric plate 20 and the drive shaft 10, a drive disk mounted on to the eccentric plate 20 through bearing 50, and a clutch wheel assembly driven by the drive disk. The drive disk and clutch wheel assembly are not limited to the structures disclosed in the background, but may be of other clutch structures.

Figure 1:
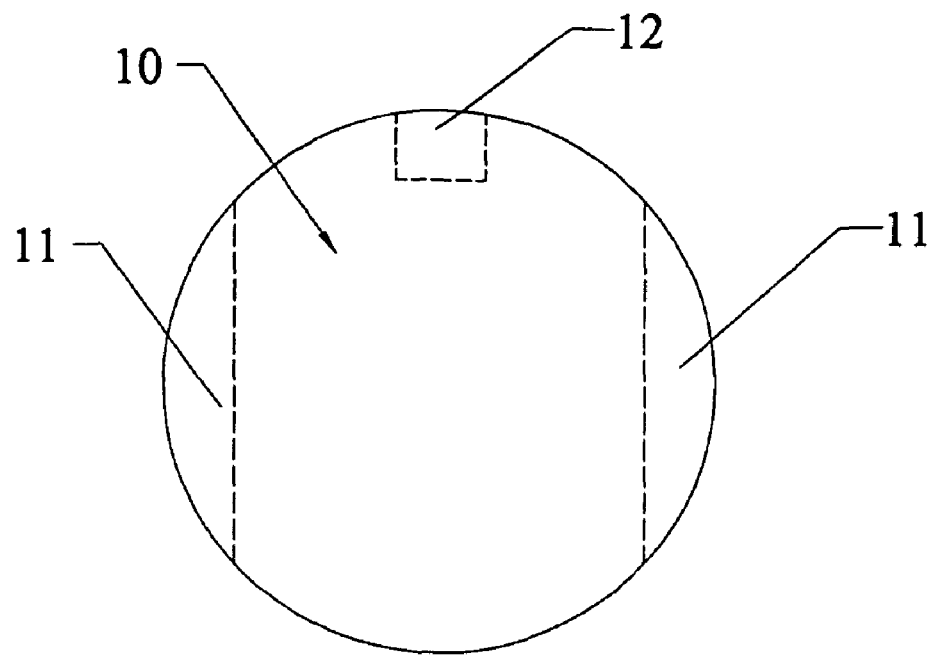
FIG. 1 is a front end view of a drive shaft of an automatic stepless transmission in accordance with an embodiment of the present application.
Figure 2:
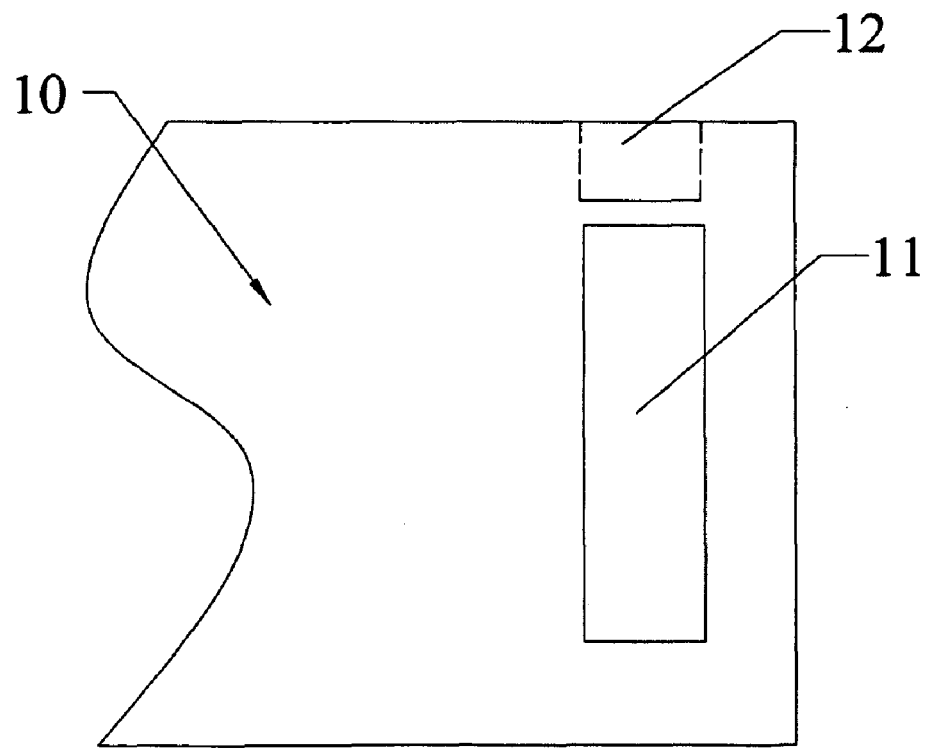
FIG. 2 is a fragmentary side view of the drive shaft of FIG. 1.
Figure 3:
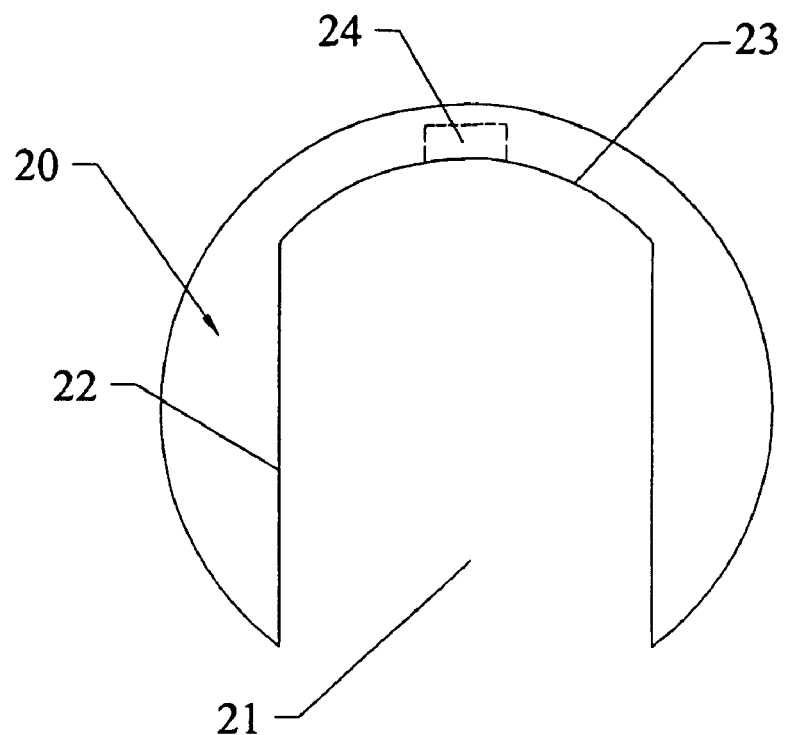
FIG. 3 is a front end view of an eccentric plate of the automatic stepless transmission in accordance with an embodiment of the present application.

As shown in FIGS. 1 and 2, the outer surface of the drive shaft 10 may be provided with two parallel guide slots 11. As shown in FIG. 3, the eccentric plate 20 is generally C-shaped with a notch 21 cooperating with the drive shaft 10. The notch 21 may include two parallel segments 22 in parallel engagement with the two guide slots 11, and an arc segment 23 extending between the ends of the two parallel segments 22. When the eccentric plate 20 is sleeved on to the drive shaft 10, parallel segments 22 of the eccentric plate 20 abut against the guide slots 11 of the drive shaft 10 forcing the eccentric plate 20 to move only parallelly with respect to the guide slots 11, but not rotatably relative to the drive shaft 10.

Figure 4:
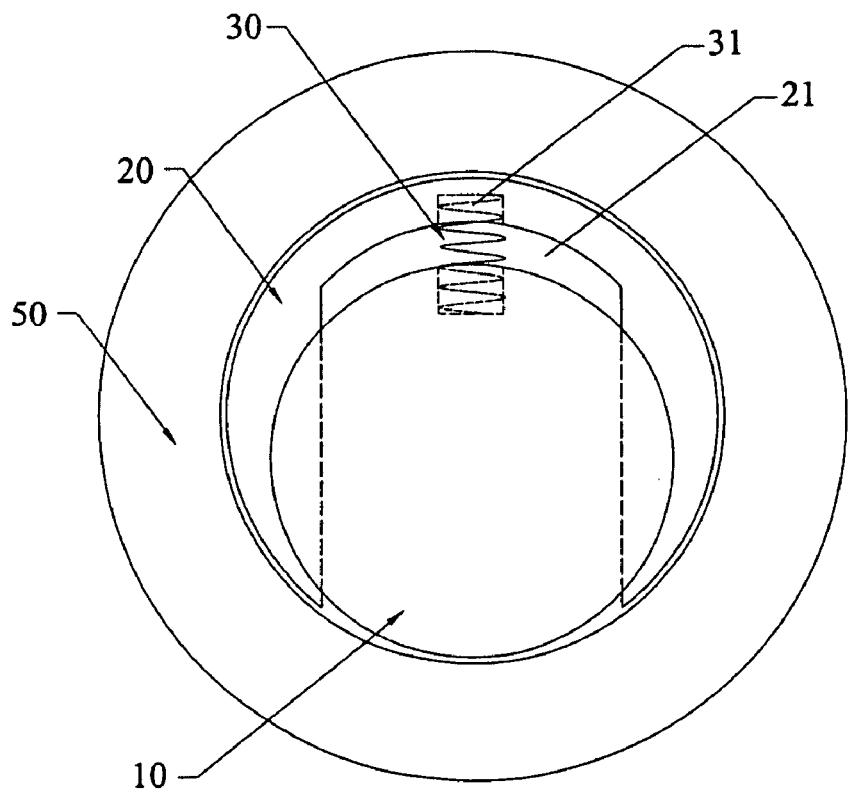
FIG. 4 shows an assembly of the drive shaft, the eccentric plate within a bearing while the automatic stepless transmission is at its maximum eccentricity state.
Figure 5:
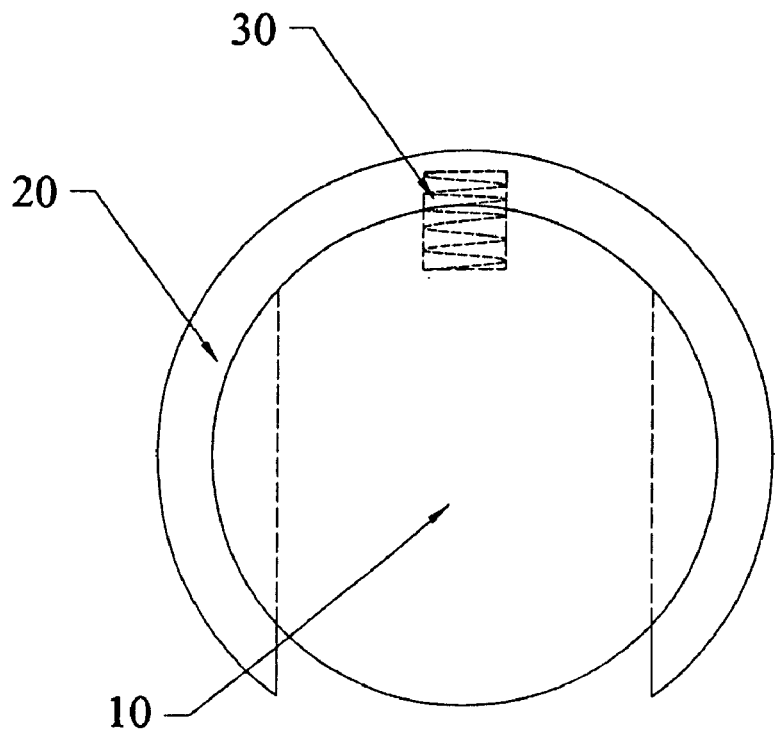
FIG. 5 shows the drive shaft and the eccentric plate while the automatic stepless transmission is at its minimum eccentricity state.

As shown in FIGS. 4 and 5, the resilient regulation mechanism 30 is disposed between the eccentric plate 20 and the drive shaft 10. According to the illustrated embodiment, the resilient regulation mechanism 30 may be in the form of a spring 31. It may also be in the form of an elastic article such as a rubber or a spring plate. For easy installation of the spring 31 between the eccentric plate 20 and the drive shaft 10, a first recess 24 may be formed at an inner side of the eccentric plate 20, and a second recess 12 may be formed on the drive shaft at a position oppositely facing the first recess 24. One end of the spring 31 can be received inside the first recess 24, and the other end of the spring 31 can be received in the second recess 12 for preventing the spring from dislocating.

As shown in FIG. 4, an inner ring of the bearing 50 on the drive disk is sleeved on to the eccentric plate 20. With the effect of the spring 31, the eccentric plate 20 is at a maximum eccentric position, and the drive disk is at a maximum eccentric state. When the drive shaft 10 rotates, the drive disk rotates along with the drive shaft 10. The maximum eccentricity of the drive disk is half of the difference of inner diameter of the bearing 50 and the diameter of the drive shaft 10. In other words, the maximum eccentricity of the automatic stepless transmission determines the minimum variable ratio, maximum rotate speed, and minimum torque of the transmission of the present application.

The automatic stepless transmission disclosed in the present application can be mainly used for working condition with variable load such as electric bike and cloth rolling machine, etc. When the load acting on the resilient regulation mechanism is less than a certain value, which is, according to the present embodiment, the stiffness of the spring 31, the load is not heavy enough to compress the spring 31 and the drive disk remains at a maximum eccentricity. When the load acting on the spring 31 is greater than that certain value, the spring 31 is compressed, and the eccentric plate 20 slides towards the drive shaft 10. This decreases the eccentricity of the drive disk. When the eccentricity of the drive disk decreases, the automatic stepless transmission increases its variable ratio, lowers its rotation speed, and increases the torque. When the input power remains unchanged, the output rotation speed and torque of the automatic stepless transmission can be automatically adjusted when the load changes.

As shown in FIG. 5, when the arc segment 23 at the inner side of the eccentric plate 20 compresses the spring 31 and contacts the outer surface of the drive shaft 10, the drive disk is at its minimum eccentric position where the automatic stepless transmission has the lowest rotation speed, maximum variable ratio, and maximum torque state. Therefore, the thickness at the center line of the eccentric plate 20 parallel to the guide slots determines the minimum eccentricity of the drive disk.

Figure 6:
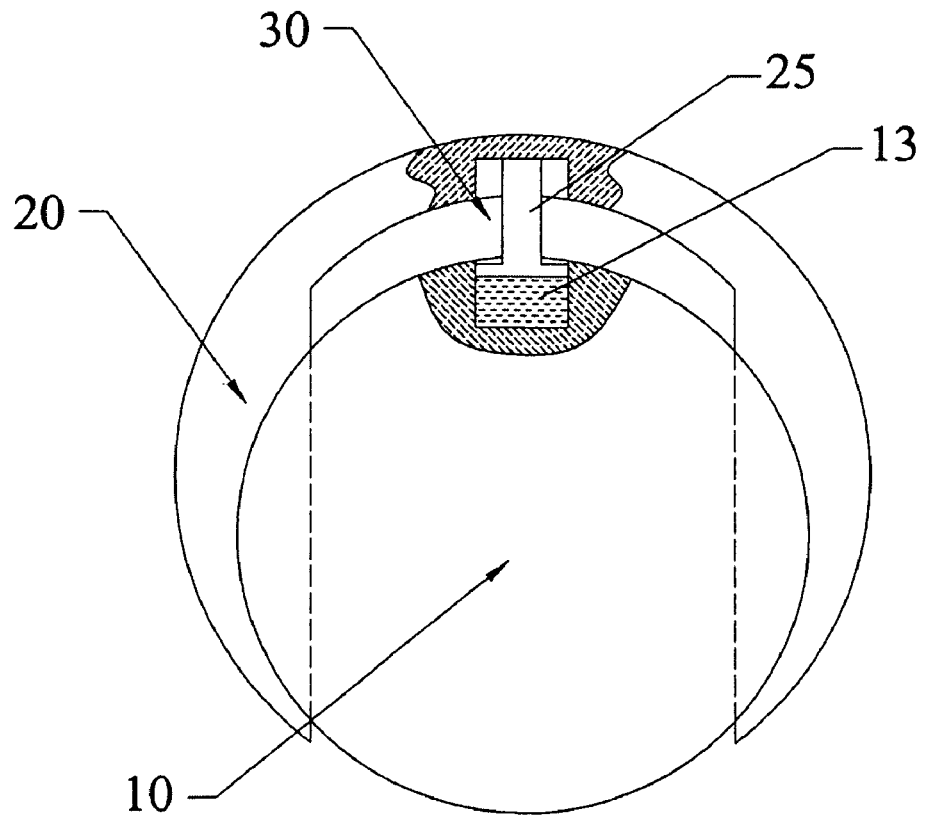
FIG. 6 shows a resilient regulation mechanism of the automatic stepless transmission in accordance with an embodiment of the present application.
Figure 7:
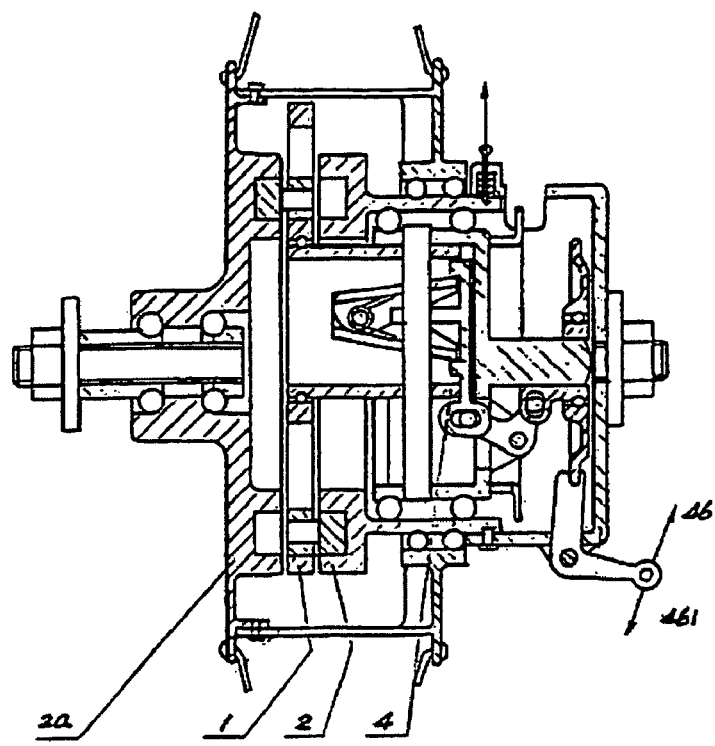
FIG. 7 is a cross sectional view of a stepless transmission of the prior art.
Figure 8:
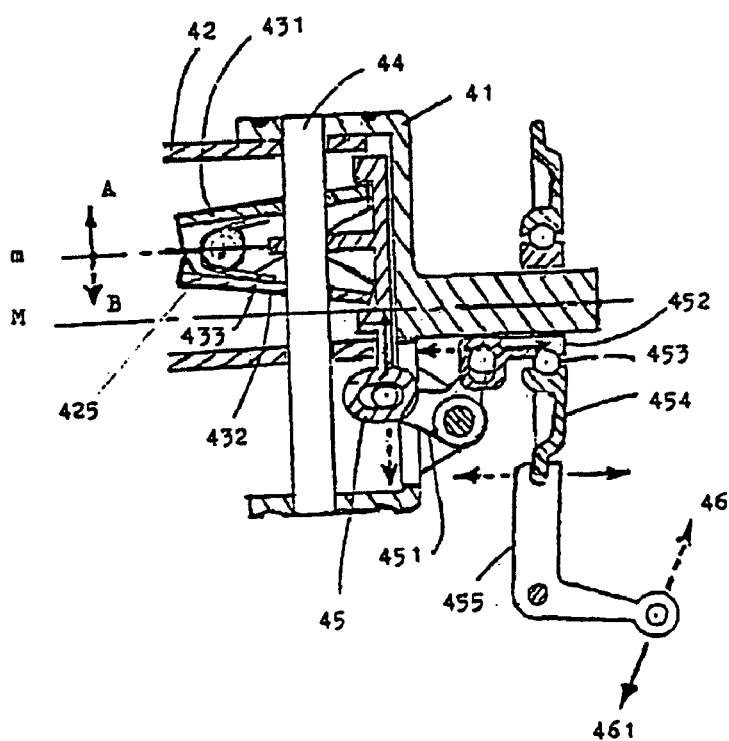
FIG. 8 is a gear shifting mechanism of the stepless transmission of FIG. 7.

FIG. 6 shows a second embodiment of the resilient regulation mechanism 30 of the automatic stepless transmission. It includes a chamber 13 provided on the drive shaft 10, a piston 25 fixed at the eccentric plate 20. The piston 25 is slidable within the chamber 13 which is filled with gas or liquid under a predetermined pressure. It is understood that the chamber 13 may be provided on the eccentric plate 20, and the piston 25 may be fixed at the drive shaft 10 instead. When the load is less than the pressure of gas or liquid inside the chamber 13, the piston 25 is at the farthest end and the eccentric plate 20 is at its maximum eccentric position. In other words, the drive disk is at its maximum eccentric position. When the load is greater than the pressure of the gas or liquid, it pushes the piston 25 such that it compresses the gas or liquid to reduce the eccentricity of the eccentric plate 20. The decrease of eccentricity of the drive disk increases the variable ratio and torque, lowers the rotation speed, and thus the result of automatic output rotation speed and torque can be achieved.

What is claimed is:

1. An automatic stepless transmission comprising:
   a drive shaft, a drive disk driven by the drive shaft, a clutch wheel assembly driven by the drive disk, an outer surface of the drive shaft being provided with two parallel guide slots, the drive shaft being received in a notch of an eccentric plate at the position of the guide slots, the notch of the eccentric plate defining parallel segments abutting against the guide slots and allowing the eccentric plate to move only parallel to the guide slots, a compressible resilient regulation mechanism disposed between an inner side of the eccentric plate and an outer surface of the drive shaft, the drive disk being mounted on the eccentric plate through a bearing, whereby the eccentric plate carries out eccentric motion vertically towards the axis of the drive shaft under the regulation of the resilient regulation mechanism, and drives the drive disk to carry out corresponding eccentric motion.

2. The automatic stepless transmission as claimed in claim 1, wherein the notch of the eccentric plate further defines an arc segment extending between the ends of the parallel segments for mating with the outer surface of the drive shaft.

3. The automatic stepless transmission as claimed in claim 1, wherein the resilient regulation mechanism is in the form of a spring or rubber disposed between an inner side of the eccentric plate and an outer surface of the drive shaft.

4. The automatic stepless transmission as claimed in claim 3, wherein the inner side of the eccentric plate is provided with a first recess, the drive shaft is provided with a second recess oppositely facing the first recess, and the spring or rubber is received in the first and second recesses.

5. The automatic stepless transmission as claimed in claim 1, wherein the resilient regulation mechanism is in the form of a chamber provided on the drive shaft, and a piston connected to the eccentric plate, and the chamber is filled with gas or liquid under a predetermined pressure.

6. The automatic stepless transmission as claimed in claim 1, wherein the resilient regulation mechanism is in the form of a chamber provided on the eccentric plate, and a piston connected to the drive shaft, and the chamber is filled with gas or liquid under a predetermined pressure.

7. The automatic stepless transmission as claimed in claim 1, wherein the maximum eccentricity of the drive disk is half the difference of the inner diameter of the bearing and the diameter of the drive shaft.

8. The automatic stepless transmission as claimed in claim 7, wherein the minimum eccentricity of the drive disk is the thickness of the eccentric plate at a central line parallel to the guide slots.

9. An automatic stepless transmission comprising:
   a drive shaft having two parallel guide slots;
   an eccentric plate having a notch defining two parallel segments slidably engaged with the two guide slots; and
   a compressible resilient regulation mechanism being disposed between the drive shaft and the eccentric plate;
   wherein the eccentric plate is adapted to carry out eccentric motion between a minimum eccentric position and a maximum eccentric position in response to a load acting on the resilient regulation mechanism, thereby transmitting the eccentric motion to a drive disk mounted on the eccentric plate through a bearing.

10. The automatic stepless transmission as claimed in claim 9, wherein the eccentric plate has an arc segment extending between the ends of the two parallel segments, and is adapted to mate with and abut against an outer surface of the drive shaft.

11. The automatic stepless transmission as claimed in claim 9, wherein the resilient regulation mechanism is in the form of a spring.

12. The automatic stepless transmission as claimed in claim 9, wherein the resilient regulation mechanism is in the form of a rubber.

13. The automatic stepless transmission as claimed in claim 9, wherein the resilient regulation mechanism is in the form of a spring plate.

14. The automatic stepless transmission as claimed in claim 9, wherein one end of the resilient regulation mechanism is received in a first recess provided on the drive shaft, and the other end of the resilient regulation mechanism is received in a second recess provided on the eccentric plate oppositely facing the first recess.

15. The automatic stepless transmission as claimed in claim 9, wherein the resilient regulation mechanism is in the form of a chamber provided on the drive shaft, and a piston connected to the eccentric plate, and the piston is slidable within the chamber which is filled with gas or liquid under a predetermined pressure.

16. The automatic stepless transmission as claimed in claim 9, wherein the resilient regulation mechanism is in the form of a chamber provided on the eccentric plate, and a piston connected to the drive shaft, and the piston is slidable within the chamber which is filled with gas or liquid under a predetermined pressure.

17. The automatic stepless transmission as claimed in claim 9, wherein the eccentric plate is generally C-shaped.

18. The automatic stepless transmission as claimed in claim 9, wherein the maximum eccentricity of the drive disk is half the difference of the inner diameter of the bearing and the diameter of the drive shaft.

19. The automatic stepless transmission as claimed in claim 9, wherein the minimum eccentricity of the drive disk is the thickness of the eccentric plate at a center line parallel to the guide slots.

20. The automatic stepless transmission as claimed in claim 9, further comprising a clutch wheel assembly driven by the drive disk.

* * * * *